US012728982B2

(12) United States Patent
Gray et al.

(10) Patent No.: US 12,728,982 B2
(45) Date of Patent: Sep. 8, 2026

(54) PROPELLER

(71) Applicant: ANALYTICAL MECHANICS ASSOCIATES, INC., Hampton, VA (US)

(72) Inventors: Matthew N. Gray, Hampton, VA (US); Caleb Robb, Newport News, VA (US); Todd Ferrante, Newport News, VA (US); Albion H Bowers, Edwards, CA (US)

(73) Assignees: Analytical Mechanics Associates, Inc., Hampton, VA (US); United States of America as Represented by the Administrator of NASA, Washington, DC (US)

( * ) Notice: Subject to any disclaimer, the term of this patent is extended or adjusted under 35 U.S.C. 154(b) by 0 days.

(21) Appl. No.: 19/009,978

(22) Filed: Jan. 4, 2025

(65) Prior Publication Data

US 2025/0223025 A1 Jul. 10, 2025

Related U.S. Application Data

(60) Provisional application No. 63/617,583, filed on Jan. 4, 2024.

(51) Int. Cl.
*B64C 11/18* (2006.01)
*B64C 11/20* (2006.01)

(52) U.S. Cl.
CPC .............. *B64C 11/18* (2013.01); *B64C 11/20* (2013.01)

(58) Field of Classification Search
CPC ......... B64C 11/16; B64C 11/18; B64C 11/20; F04D 29/38–388
See application file for complete search history.

(56) References Cited

U.S. PATENT DOCUMENTS 2,764,803 A * 10/1956 Lampton ................ B21D 53/78 29/889.72
10,414,485 B1 9/2019 Bowers
10,787,270 B2 * 9/2020 Goodhand .............. B64C 11/48
2025/0223025 A1 * 7/2025 Gray ....................... B64C 11/20

FOREIGN PATENT DOCUMENTS

CN 104816827 A * 8/2015
CN 102582831 B * 5/2016
CN 109110124 A * 1/2019
CN 109178295 A * 1/2019
CN 110701106 A * 1/2020
KR 20170121982 A * 11/2017

* cited by examiner

*Primary Examiner* — Christopher R Legendre
(74) *Attorney, Agent, or Firm* — Mueting Raasch Group

(57) ABSTRACT

Improved blade designs for turbomachinery, such as blade designs for propellers, have non-constant airfoil distributions and/or coefficient of lift distributions across the blade span. An improved blade may include the following three blade sections between a blade root and a blade tip: a first blade section, or span, extending from the blade root to a transition start point, a transition section, or span, extending from the transition start point to a transition end point; and a second blade section, or span, extending from the transition end point to the blade tip. The transition section may define or be a linear or non-linear transition span. Further, an improved blade may be defined or be configured as at least two different airfoils along the blade span and/or may be configured to have at least two different coefficients of lift along the blade span.

8 Claims, 5 Drawing Sheets

PROPELLER

CROSS-REFERENCE TO RELATED PATENT APPLICATION

This patent application claims the benefit of U.S. Provisional Application No. 63/617,583 entitled "Minimum Torque Propeller Design for Increased Efficiency and Decreased Noise," filed on Jan. 4, 2024, the contents of which are hereby incorporated by reference in their entirety.

GOVERNMENT RIGHTS

The invention described herein was made in part by employees of the United States Government and may be manufactured and used by or for the Government of the United States of America for governmental purposes without the payment of any royalties thereon or therefore. The Government of the United States of America has certain rights in this invention.

The present invention relates to designs of blades to move fluid, such as propeller blades, fan blades, compressor blades, impeller blades, turbine blades, and the like. More specifically, the invention relates to designs of propeller blades for aerial vehicles, such as Unmanned Aerial Systems (UASs) or Unmanned Aerial Vehicles (UAVs).

UASs or UAVs are becoming more prevalent, especially in urban environments as the field of Urban Air Mobility (UAM) gains interest from academia, government, and industry. High noise pollution and inefficiencies of current UAS and UAV configurations have the potential to render UAM technologies impractical due to public annoyance and nonacceptance.

Classical propeller configurations, especially those used in current UASs and UAVs, are a known contributor to high noise pollution and inefficiencies. Classical propeller configurations are designed based on the minimum induced loss (MIL) theory which has not changed since the work done starting in the 1920s by Ludwig Prandtl and his student Albert Betz and Theodore Theodorsen. The MIL design approach of Prandtl, Betz, and Theodorsen reflected in the design of classical propellers assumes a constant lift coefficient across the propeller blade and only considers a local optimization of propeller efficiency across each two-dimensional (2D) section of the blade and does not consider the global three-dimensional (3D) effects of the propeller nor a minimum energy solution.

National Aeronautics and Space Administration (NASA) has previously studied improvements to blade designs intended to produce a global minimum torque solution (i.e., the minimum total torque across the blade span) as described in U.S. Pat. No. 10,414,485 to Bowers (herein after referred to as "Bowers"), the contents of which are hereby incorporated by reference in their entirety. The approach provided by Bowers optimized the propeller twist by minimizing the overall torque under a constant thrust condition. However, the propeller blade with the twist distribution described in Bowers was not designed with noise reduction as a primary consideration.

While there has been research into new propeller designs undertaken, the designs have typically sacrificed efficiency for noise reduction, or vice versa. A propeller design that provided lower global torque with higher maximum efficiency and lower noise generation than classical propeller designs would be beneficial, especially to support adoption of UAM.

SUMMARY

Various embodiments may include turbomachinery designs providing lower global torque with higher maximum efficiency and lower noise generation. Some embodiments may include propeller designs that provide lower global torque with higher maximum efficiency and lower noise generation in comparison to classical propeller designs. Various embodiments may include blade designs for turbomachinery, such as blade designs for propellers, that have non-constant airfoil distributions across the blade span.

Various embodiments may include designs of blades, such as propeller blades, fan blades, compressor blades, impeller blades, turbine blades, and the like, for turbomachinery, such as propellers, fans, compressors, impellers, turbines, and the like, in which the blade is configured as at least two different airfoils along the blade span and/or is configured to have at least two different coefficients of lift along the blade span. In various embodiments, a blade may be configured to form three blade sections between a blade root and a blade tip-more specifically, a first blade section, or span, extending from the blade root to a transition start point, a transition section, or span, extending from the transition start point to a transition end point, and a second blade section, or span, extending from the transition end point to the blade tip. In various embodiments, the transition section may define or be a linear transition span. In various embodiments, the transition section may define or be a non-linear transition span. Various embodiments may include designs of propeller blades for aerial vehicles, such as UASs and UAVs.

In some embodiments, the first blade section may define, or have, a first coefficient of lift higher than a second coefficient of lift defined by the second blade span. In some embodiments, the transition section may define or be a linear transition span in which a rate of change of coefficient of lift at the transition start point to the coefficient of lift at the transition end point is constant per unit length of the span of the transition section. In some embodiments, the transition section may define, or be, a non-linear transition span in which a rate of change of coefficient of lift at the transition start point to the coefficient of lift at the transition end point is not constant per unit length of the span of the transition section.

In some embodiments, the first blade section may include (e.g., be configured to form or define at least) a first airfoil and the second blade span may include (e.g., be configured to form or define at least) a second airfoil. In some embodiments, the first airfoil may be a more cambered airfoil than the second airfoil. In some embodiments, the transition section may be a linear transition span in which a rate of change of the camber at the transition start point to the camber at the transition end point is constant per unit length of the span of the transition section. In some embodiments, the transition section may be a non-linear transition span in which a rate of change of the camber at the transition start point to the camber at the transition end point is not constant per unit length of the span of the transition section.

One illustrative embodiment is a blade for a propeller of a turbomachinery system, comprising: a blade tip at a distal end and a blade span from a blade root to the blade tip, wherein the blade span is configured to form at least three blade sections, comprising: a first blade span extending from the blade root to a transition start point; a transition span extending from the transition start point to a transition end point; and a second blade span extending from the transition end point to the blade tip, wherein the coefficient of lift of the first blade span is higher than the coefficient of lift of the second blade span.

Another illustrative embodiment is a propeller blade including a blade body that extends from a blade tip to a blade root defining a blade span. The blade body may include a first blade section extending from the blade root to a transition start point and defining a first coefficient of lift, a transition section extending from the transition start point to a transition end point, a second blade section extending from the transition end point to the blade tip and defining a second coefficient of lift different than the first coefficient of lift. The first coefficient of lift is higher than the second coefficient of lift.

Another illustrative embodiment is a propeller blade including a blade body extending from a blade tip to a blade root defining a blade span. The blade body includes a first blade section extending from the blade root to a transition start point, a transition section extending from the transition start point to a transition end point, and a second blade section extending from the transition end point to the blade tip. The first blade section includes (e.g., defines, forms, etc.) a first airfoil, and the second blade section includes (e.g., defines, forms, etc.) a second airfoil. The first airfoil is different than the second airfoil.

Another illustrative embodiment is a blade for a propeller of a turbomachinery system, comprising: a blade tip at a distal end and a blade span from a blade root to the blade tip, wherein the blade span is configured to form at least three blade sections, comprising: a first blade span extending from the blade root to a transition start point, the first blade span comprising a first airfoil; a transition span extending from the transition start point to a transition end point; and a second blade span extending from the transition end point to the blade tip, the second blade span comprising a second airfoil, wherein the first airfoil is different from the second airfoil.

These and other features, advantages, and objects of the present invention will be further understood and appreciated by those skilled in the art by reference to the following specification, claims, and appended drawings.

BRIEF DESCRIPTION OF THE DRAWINGS

The accompanying drawings, which are incorporated herein and constitute part of this specification, illustrate example embodiments of the claims, and together with the general description given above and the detailed description given below, serve to explain the features of the claims.

DETAILED DESCRIPTION

Figure 1:
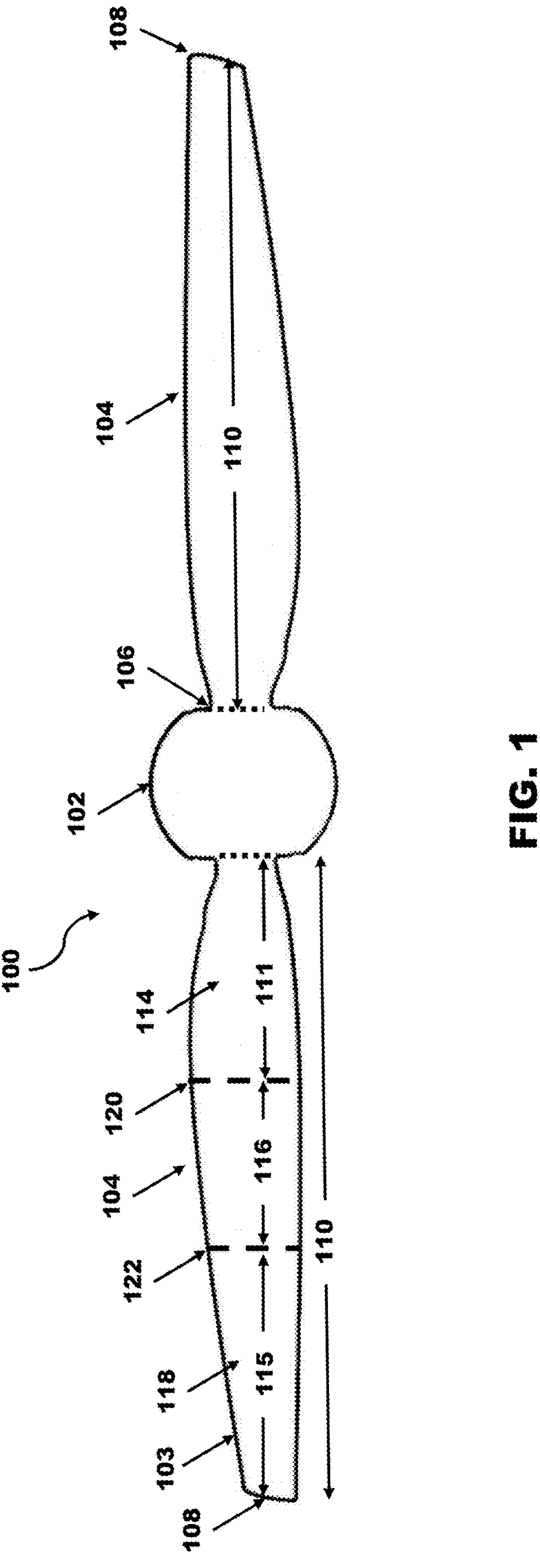
FIG. 1 depicts a propeller blade in accordance with various embodiments.

The various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims. The following description of the embodiments of the invention is not intended to limit the invention to these embodiments but rather to enable a person skilled in the art to make and use this invention.

It is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Various embodiments are described herein with reference to the term "airfoil." One skilled in the art will recognize that an airfoil may define a cross-sectional shape of a blade. Airfoil shapes are defined by physical characteristics, such as chord, mean camber line, thickness, and camber. The chord may be defined as the straight-line distance from leading edge to the trailing edge. The mean camber line may be the curve defined by the midpoints between the opposing perpendicular points on the surfaces of the blade. The thickness may be defined as the cross-sectional differences between the surfaces of the blade. The maximum distance between the chord and mean camber line is the camber of the airfoil. The camber defines the curvature of the airfoil. Symmetrical airfoils have no camber. Non-symmetric airfoils have a non-zero camber. The higher the value of the camber, the higher the curvature of the airfoil. Airfoils are often designated by alpha numeric numbers that one of ordinary skill will recognize as associated with specifically defined characteristics of that designated airfoils. Examples of such airfoil designations include the National Advisory Committee for Aeronautics (NACA) four-digit codes, Martin Hepperle (MH) three-digit codes, and Selig (S) four-digit codes.

Various embodiments are described herein with reference to the term "coefficient of lift." One skilled in the art will recognize that coefficient of lift, also often discussed in the art as the "lift coefficient." as typically being expressed in equations as "C" and being the number that models the dependencies of shape, inclination, and flow conditions on a blade. The coefficient of lift may be a value defined as the ratio of lifting force of the blade to the force produced by the dynamic pressure multiplied by the area.

Comparisons are provided herein of the present illustrative propeller blades with "a classic propeller blade design." For reference, the classic propeller blade design, as used herein, constitutes a constant degree of twist across the blade. From a practical standpoint, this constant degree of twist does not actually begin directly at the root of the blade (which is defined herein as the portion of the blade that attaches to the rotatable hub of a turbomachinery blade system, such as the rotatable hub of a propeller), due to the necessity of manufacturing the blade and attaching it to the hub. As such, the actual degree of twist begins at some point up to the first twenty percent of the surface area of the blade (both in the classical propeller blade design and the present invention). So, when twist distribution across the propeller blade is discussed herein, the term is meant to mean from the point the twist begins (at some point from the root to about 20% from the root of the blade surface).

One skilled in the art also recognizes that the twist distribution of a propeller blade directly correlates to the "angle of attack" of said blade. Hence, herein when discussing the angle of attack of the propeller blade, this is akin to discussing the twist of the propeller blade.

Classical propeller blade design has focused on MIL propellers as being the optimal solution in propeller design. However, the global minimum torque propeller discussed in Bowers provides a propeller that is loaded more inboard similar to the Prandtl Bell Spanload wing. Propellers with such inboard loading in comparison to MIL propellers may be referred to as "Prandtl" propellers to distinguish them from MIL propellers. Bowers's Prandtl propeller optimized the propeller twist by minimizing the overall torque under a constant thrust condition.

While Bowers's Prandtl propeller provides a design optimizing propeller twist by minimizing the overall torque under a constant thrust condition, there is a need for a Prandtl propeller design that provides lower global torque with higher maximum efficiency and lower noise generation. In contrast to Bowers's Prandtl propeller, the illustrative embodiments described herein may provide a Prandtl propeller design that provides lower global torque with higher maximum efficiency and lower noise generation by providing embodiment Prandtl blade designs in which the coefficients of lift and/or airfoils change across the blade span. Various illustrative embodiments may include blade designs for turbomachinery, such as blade designs for propellers, that have non-constant coefficients of lift and/or non-constant airfoil distributions across the blade span. By varying coefficient of lift and/or the airfoil shape along the blade span, various embodiments may enable turbomachinery designs providing lower global torque with higher maximum efficiency and lower noise generation in comparison to classical propeller designs.

Referring to FIG. 1, an embodiment propeller system 100 may include a rotatable hub 102 and at least one propeller blade 104 connected to the rotatable hub 102. The blade 104 may include a blade body 103 that has a blade tip 108 at a distal end (e.g., away from the hub 102 and blade root 106) and a blade root 106 at a proximal end coupled, or connected, to the rotatable hub 102. The blade body 103 extends from the blade tip 108 to the blade root 106 defining a blade span 110 (or blade length) from the blade root 106 to the blade tip 108. The propeller system 100 is merely one example of a two blade 104 propeller. In other configurations in accordance with various embodiments, propellers may have more than two blades, such as three, four, five, or more blades. The propeller system 100 may be suitable for use as a propeller system for aerial vehicles, such as UASs, UAVs, manned aircraft, etc. However, the embodiment blade designs described herein should be understood as not limited to propeller systems or aerial vehicles, and may be suitable for use in blades of other turbomachinery, such as fans, compressors, impellers, turbines, and the like.

The blade body 103 of the propeller blade 104 may include three blade sections between the blade root 106 and the blade tip 108, namely a first blade section, or span, 111 extending from the blade root 106 to a transition start point 120, a transition section, or span, 116 extending from the transition start point 120 to a transition end point 122, and a second blade section, or span, 115 extending from the transition end point 122 to the blade tip 108. The sum total span, or length, of the first blade section 111, the transition section 116, and the second blade section 115 may be equal to the blade span, or length, 110.

In some embodiments, the first blade section 111 may be configured (e.g., designed, formed, shaped, etc.) to have a first coefficient of lift and the second blade section 115 may be configured (e.g., designed, formed, shaped, etc.) to have a second coefficient of lift. In some embodiments, the first blade section 111 and the second blade section 115 may be configured to have different coefficients of lift. In other words, the first coefficient of lift of the first blade section 111 may be different than the second coefficient of lift of the second blade section 115. In some embodiments, the first blade section 111 may be configured (e.g., designed, formed, shaped, etc.) to have a first airfoil shape 114 and the second blade section 115 may be configured (e.g., designed, formed, shaped, etc.) to have a second airfoil shape 118. The second airfoil shape 118 may be different than the first airfoil shape 114. In some embodiments, the coefficients of lift of the first blade section 111 and the second blade section 115 may be the same while the airfoil shapes, or airfoils, 114, 118 are different. In some embodiments, the coefficients of lift of the first blade section 111 and the second blade section 115 may be different while the airfoils, or airfoil shapes, 114, 118 are the same. In some embodiments, the coefficients of lift of the first blade section 111 and the second blade section 115 may be different while the airfoils, or airfoil shapes, 114, 118 are also different from one another.

The first blade section 111 and the first airfoil, or airfoil shape, 114 extend from the blade root 106 to the transition start point 120 along the blade span 110. When the first airfoil shape 114 and second airfoil shape 118 are different, the transition start point 120 is the position along the blade span 110 at which the first blade section 111 and the first airfoil shape 114 starts to transition shape from the first airfoil shape 114 toward the second airfoil shape 118. When the coefficient of lift of the first blade section 111 and the coefficient of lift of the second blade section 115 are different, the transition start point 120 is the position along the blade span 110 at which the first blade section 111 and the first airfoil 114 starts to transition shape from the first airfoil shape 114 toward the second airfoil shape 118. When both the coefficients of lift and the airfoil shapes of the first blade section 111 and the second blade section 115 are different, the transition start point 120 is the position along the blade span 110 at which the first blade section 111 and the first airfoil shape 114 starts to transition shape from the first airfoil shape 114 and the first coefficient of lift toward the second airfoil shape 118 and the second coefficient of lift. The position of the transition start point 120 along the blade span 110 may be expressed as a percentage of the blade span 110 from the blade root 106, for example, where the blade root 106 is 0% of the blade span 110 and the blade tip 108 is 100% of the blade span 110.

When the first airfoil shape 114 and second airfoil shape 118 are different, the transition end point 122 is the position along the blade span 110 at which the shape of the blade body 103 transition from the first airfoil shape 114 to the second airfoil shape 118 is complete. When the coefficient of lift of the first blade section 111 and the coefficient of lift of the second blade section 115 are different, the transition end point 122 is the position along the blade span 110 at which the coefficient of lift transition from the coefficient of lift of the first blade section 111 to the coefficient of lift of the second blade section 115 is complete. When both the coefficients of lift and the airfoil shapes of the first blade section 111 and the second blade section 115 are different, the transition end point 122 is the position along the blade span 110 at which the coefficient of lift transition from the coefficient of lift of the first blade section 111 to the coefficient of lift of the second blade section 115 is complete and the shape transition from the first airfoil 114 shape to the second airfoil 118 shape is complete. The position of the transition end point 122 along the blade span 110 may be expressed as a percentage of the blade span 110 from the blade root 106, for example, where the blade root 106 is 0% of the blade span 110 and the blade tip 108 is 100% of the blade span 110.

The transition section 116 is the span of the blade 104 between the transition start point 120 and the transition end point 122. When the first airfoil 114 shape and second airfoil shape 118 are different, the shape of the blade 104 along the transition section 116 is neither that of the first airfoil 114 shape nor the second airfoil 118 shape, but rather a transition area in which the first airfoil 114 shape is deforming from the first airfoil 114 shape toward the second airfoil 118 shape so as to achieve the second airfoil 118 shape at the transition end point 122. In this manner, the blade 104 may be considered to have at least three different airfoil shape sections, a first shape of an airfoil along the blade span 110 from the blade root 106 to the transition start point 120, a transition shape airfoil along the blade span 110 from the transition start point 120 to the transition end point 122 that is neither the first airfoil 114 shape nor the second airfoil 118 shape, and a second shape of an airfoil along the blade span 110 from the transition end point 122 to the blade tip 108. When the coefficient of lift of the first blade section 111 and the coefficient of lift of the second blade section 115 are different, the coefficient of lift of the blade 104 along the transition section 116 is neither that of the first coefficient of lift of the first blade section 111 nor the coefficient of lift of the second blade section 115, but rather a transition area in which the first coefficient of lift is deforming toward the second coefficient of lift so as to achieve the second coefficient of lift at the transition end point 122. In this manner, the blade 104 may be considered to have at least three different coefficient of lift sections, a first coefficient of lift along the blade span 110 from the blade root 106 to the transition start point 120, a transition coefficient of lift along the blade span 110 from the transition start point 120 to the transition end point 122 that is neither the first coefficient of lift nor the second coefficient of lift, and a second coefficient of lift along the blade span 110 from the transition end point 122 to the blade tip 108. When both the coefficients of lift and the airfoil shapes of the first blade section 111 and the second blade section 115 are different, the coefficient of lift of the blade 104 along the transition section 116 is neither that of the first coefficient of lift of the first blade section 111 nor the coefficient of lift of the second blade section 115 and the shape of the blade 104 along the transition section 116 is neither that of the first airfoil 114 shape nor the second airfoil 118 shape, but rather a transition area in which the first coefficient of lift is deforming toward the second coefficient of lift so as to achieve the second coefficient of lift at the transition end point 122 and in which the first airfoil 114 shape is deforming from the first airfoil 114 shape toward the second airfoil 118 shape so as to achieve the second airfoil 118 shape at the transition end point 122. In this manner, the blade 104 may be considered to have at least three different coefficient of lift sections, a first coefficient of lift and airfoil 114 shape along the blade span 110 from the blade root 106 to the transition start point 120, a transition coefficient of lift and transition airfoil shape along the blade span 110 from the transition start point 120 to the transition end point 122 that is neither the first coefficient of lift nor the second coefficient of lift and that is neither the first airfoil 114 shape nor the second airfoil 118 shape, and a second coefficient of lift and airfoil 118 shape along the blade span 110 from the transition end point 122 to the blade tip 108.

In various embodiments, the transition span may be a linear transition span in which the rate of change of coefficient of lift and/or the rate of change of the airfoil shape at the transition start point 120 to the coefficient of lift and/or the airfoil shape at the transition end point 122 is constant per unit length of blade span of the transition section 116. For example, the coefficient of lift of the first blade section 111 may be a value of 1, and the coefficient of lift of the second blade section 115 may be a value of 0.5. The transition section 116 may be 5 units long and the coefficient of lift may fall by equal measures, i.e., 0.1, over each unit length of the transition section 116 such that the coefficient of lift at the transition start point 120 is 1 and the coefficient of lift at the transition end point 122 is 0.5. Such a transition section 116 may be considered a linear transition span. In various embodiments, the change of the airfoil shape over the linear transition span of the transition section 116 may be constant. The blending, or change, rate from changing from the first airfoil 114 to the second airfoil 118 may be constant over the linear transition span of the transition section 116. For example, a rate of change of the airfoil shape from the first airfoil 114 to the second airfoil 118 may be steady as the linear transition span of the transition section 116 is a greater percentage along the blade span 110.

In various embodiments, the transition section 116 may be a non-linear transition span in which a rate of change of coefficient of lift and/or the rate of change of the airfoil shape at the transition start point to the coefficient of lift and/or the airfoil shape at the transition end point is not constant per unit length of blade span of the transition section 116. For example, the coefficient of lift of the first blade section 111 may be a value of 1, and the coefficient of lift of the second blade section 115 may be a value of 0.5. The transition section 116 may be 5 units long and the coefficient of lift may fall by varied amounts (e.g., 0.1, 0.2, 0.05, 0.05, 0.1; or 0.05, 0.1, 0.3, 0.025, 0.025, etc.) over each unit length of the transition section 116 such that the coefficient of lift at the transition start point 120 is 1 and the coefficient of lift at the transition end point 122 is 0.5. Such a transition section 116 may be considered a non-linear transition span. In various embodiments, the change of the airfoil shape over the non-linear transition span of the transition section 116 may not be constant. The blending, or change, rate from changing from the first airfoil 114 to the second airfoil 118 may not be constant over the non-linear transition span of the transition section 116. For example, a rate of change of the airfoil shape from the first airfoil 114 to the second airfoil 118 may increase as the non-linear transition span of the transition section 116 is a greater percentage along the blade span 110. In various embodiments, the change of the airfoil shape over the non-linear transition section 116 may not be constant. The blending, or change, rate from changing from the first airfoil 114 to the second airfoil 118 may not be constant over the non-linear transition span of the transition section 116. For example, a rate of change of the airfoil shape from the first airfoil 114 to the second airfoil 118 may increase as the non-linear transition span of the transition section 116 is a greater percentage along the blade span 110.

In some embodiments, the first blade section 111 may be a higher coefficient of lift blade section than the second blade section 115. In some embodiments, the first blade section 111 may have a coefficient of lift selected from a range of coefficients of lift from 1 to 0.5 and the second blade section 115 may have a different and lower coefficient of lift selected from a range of coefficients of lift from 0 to 0.1. As an example, the first blade section 111 may have a coefficient of lift of 1 and the second blade section 115 may have a coefficient of lift of 0.5. As another example, the first blade section 111 may have a coefficient of lift of 0.75 and the second blade section 115 may have a coefficient of lift of 0.25.

In some embodiments, the first airfoil 114 may be a more cambered airfoil than the second airfoil 118. In some embodiments, the first airfoil 114 may have a maximum camber selected from a range of maximum cambers of from 0.1% to 9.0% and the second airfoil 118 may have a different and lower maximum camber selected from a range of maximum cambers from 0.0% to 8.9%. As an example, the first airfoil 114 may have a maximum camber of 6% and the second airfoil 118 may have a maximum camber of 4%. As another example, the first airfoil 114 may have a maximum camber of 5.5% and the second airfoil 118 may have a maximum camber of 4.2%. The transition section 116 may be an area of transition between the first airfoil 114 and the second airfoil 118.

The size of the transition section 116 may be adjusted in various embodiments. The amount of the blade span 110 that the transition section 116 may represent may be larger or smaller than the amount of the blade span 110 that the first airfoil 114 and/or first blade section 111 represents. The amount of the blade span 110 that the linear transition section 116 may represent may be larger or smaller than the amount of the blade span 110 that the second airfoil 118 and/or second blade section 115 represents.

In some embodiments, the transition start point 120 may be present at a position in the range of 50% to 98% of the blade span 110 and the transition end point 122 may be present at a position in the range of 51% to 99% of the blade span 110. As one example, the transition start point 120 may be present at a position of 50% of the blade span 110 and the transition end point 122 may be present at a position of 51% of the blade span 110. As another example, the transition start point 120 may be present at a position of 98% of the blade span 110 and the transition end point 122 may be present at a position of 99% of the blade span 110. As another example, the transition start point 120 may be present at a position of 60% of the blade span 110 and the transition end point 122 may be present at a position of 99% of the blade span 110. As another example, the transition start point 120 may be present at a position of 70% of the blade span 110 and the transition end point 122 may be present at a position of 95% of the blade span 110. As another example, the transition start point 120 may be present at a position of 72% of the blade span 110 and the transition end point 122 may be present at a position of 98% of the blade span 110. As a further example, the transition start point 120 may be present at a position of 65% of the blade span 110 and the transition end point 122 may be present at a position of 98% of the blade span 110.

In other words, the spans, or lengths, of each of the first blade section 111, the transition section 116, and the second blade section 115 may be defined in terms of a percentage of the blade span 110. For example, the span, or length, of the first blade section 111 may be between about 50% and 80% of the blade span 110. In one embodiment, the span of the first blade section 111 is 70% or greater than the blade span 110. In one embodiment, the span of the first blade section 111 is 72% of the blade span 110. In other embodiments, the span of the first blade section 111 is 55% or greater than the blade span 110, 65% or greater than the blade span 110, or 75% or greater than the blade span 110, and/or 85% or less than the blade span 110, 80% or less than the blade span 110, 73% or less than the blade span 110, or 70% or less than the blade span 110. Further, for example, the span, or length, of the transition section 116 may be between about 5% and 20% of the blade span 110. In one embodiment, the span of the transition section 116 is 12% or greater than the blade span 110. In one embodiment, the span of the transition section 116 is 16% of the blade span 110. In other embodiments, the span of the transition section 116 is 10% or greater than the blade span 110, 12% or greater than the blade span 110, or 15% or greater than the blade span 110, and/or 20% or less than the blade span 110, 18% or less than the blade span 110, or 16% or less than the blade span 110. Still further, for example, the span, or length, of the second blade section 115 may be between about 1% and 7% of the blade span 110. In one embodiment, the span of the second blade section 115 is 3% or less than the blade span 110. In one embodiment, the span of the second blade section 115 is 2% of the blade span 110. In other embodiments, the span of the second blade section 115 is 1% or greater than the blade span 110, 2% or greater than the blade span 110, or 2.5% or greater than the blade span 110, and/or 6% or less than the blade span 110, 5% or less than the blade span 110, 4% or less than the blade span 110, or 3% or less than the blade span 110.

Figure 2:
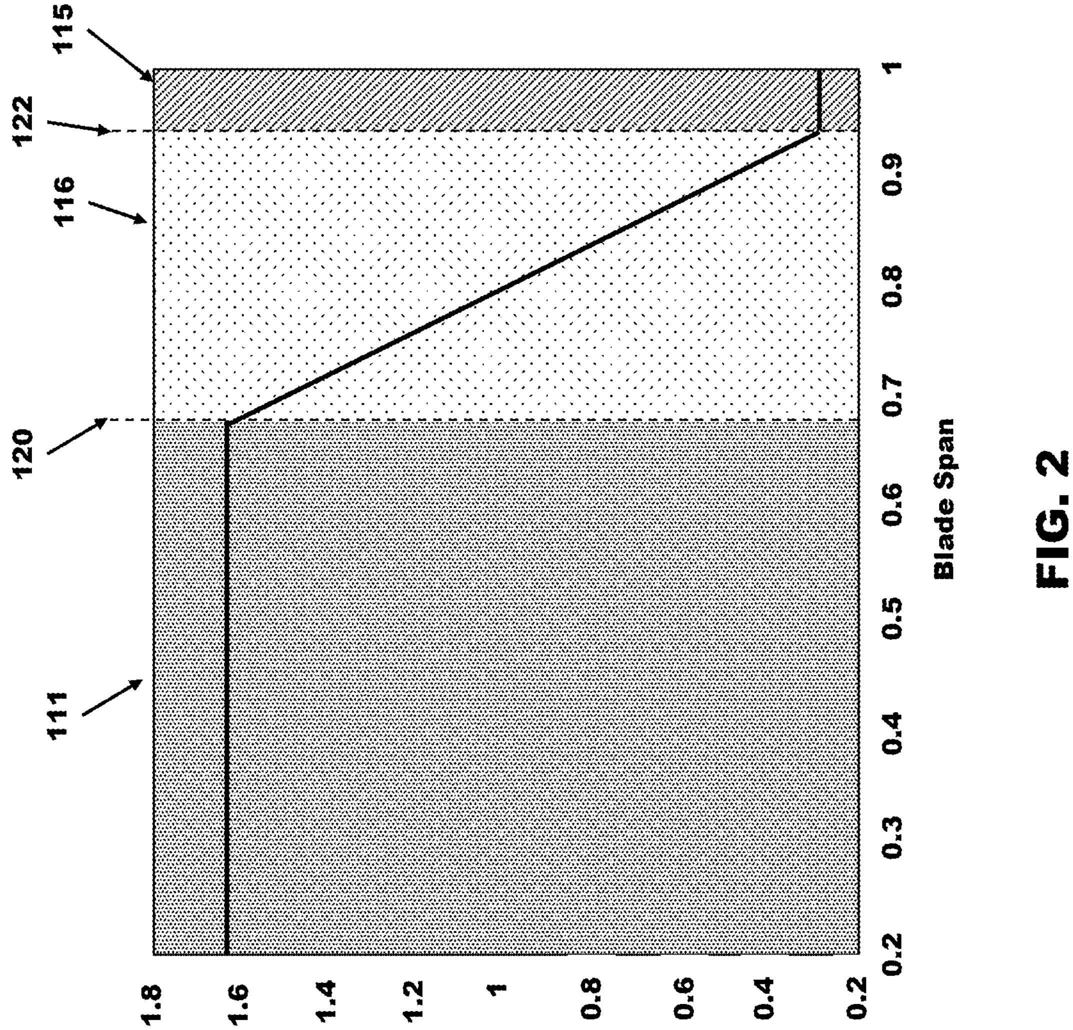
FIG. 2 is a graph of coefficient of lift linear transition across a blade span in accordance with various embodiments.

FIG. 2 is a graph of coefficient of lift linear transition across a blade span in accordance with various embodiments. Specifically, FIG. 2 illustrates the transition of a coefficient of lift for the first blade section 111 in a linear manner across the transition section 116 from the transition start point 120 to the transition end point 122. The coefficient of lift for the second blade section 115 is different than the coefficient of lift for the first blade section 111. The coefficient of lift within the transition section 116 is a straight line proceeding from the transition start point 120 to the transition end point 122, thereby representing a linear transition.

Figure 3:
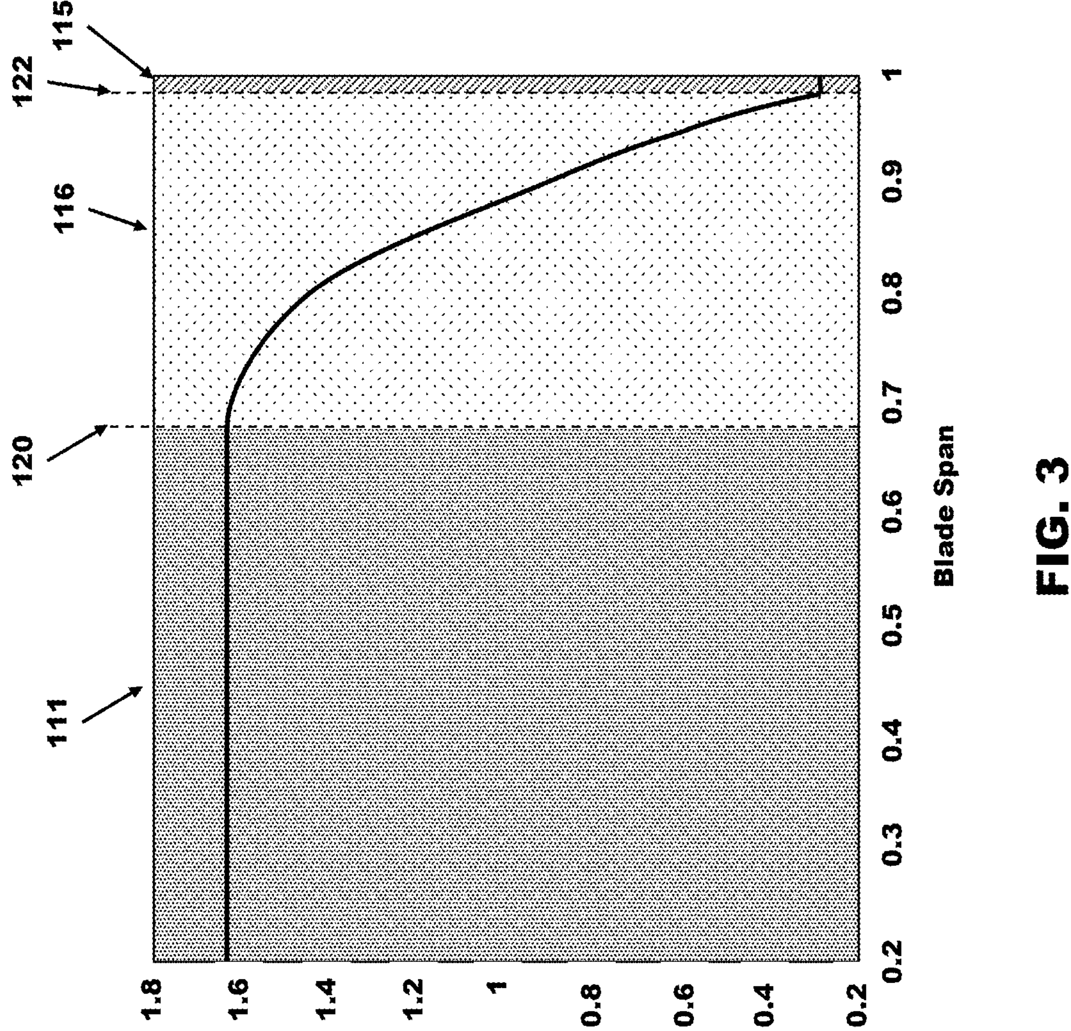
FIG. 3 is a graph of coefficient of lift non-linear transition across a blade span in accordance with various embodiments.

FIG. 3 is a graph of coefficient of lift non-linear transition across a blade span in accordance with various embodiments. Specifically, FIG. 3 illustrates the transition of a coefficient of lift for the first blade section 111 in a non-linear manner across the transition section 116 from the transition start point 120 to the transition end point 122. The coefficient of lift for the second blade section 115 is different than the coefficient of lift for the first blade section 111. The coefficient of lift within the transition section 116 is a curved line proceeding from the transition start point 120 to the transition end point 122, thereby representing a non-linear transition.

Figure 4:
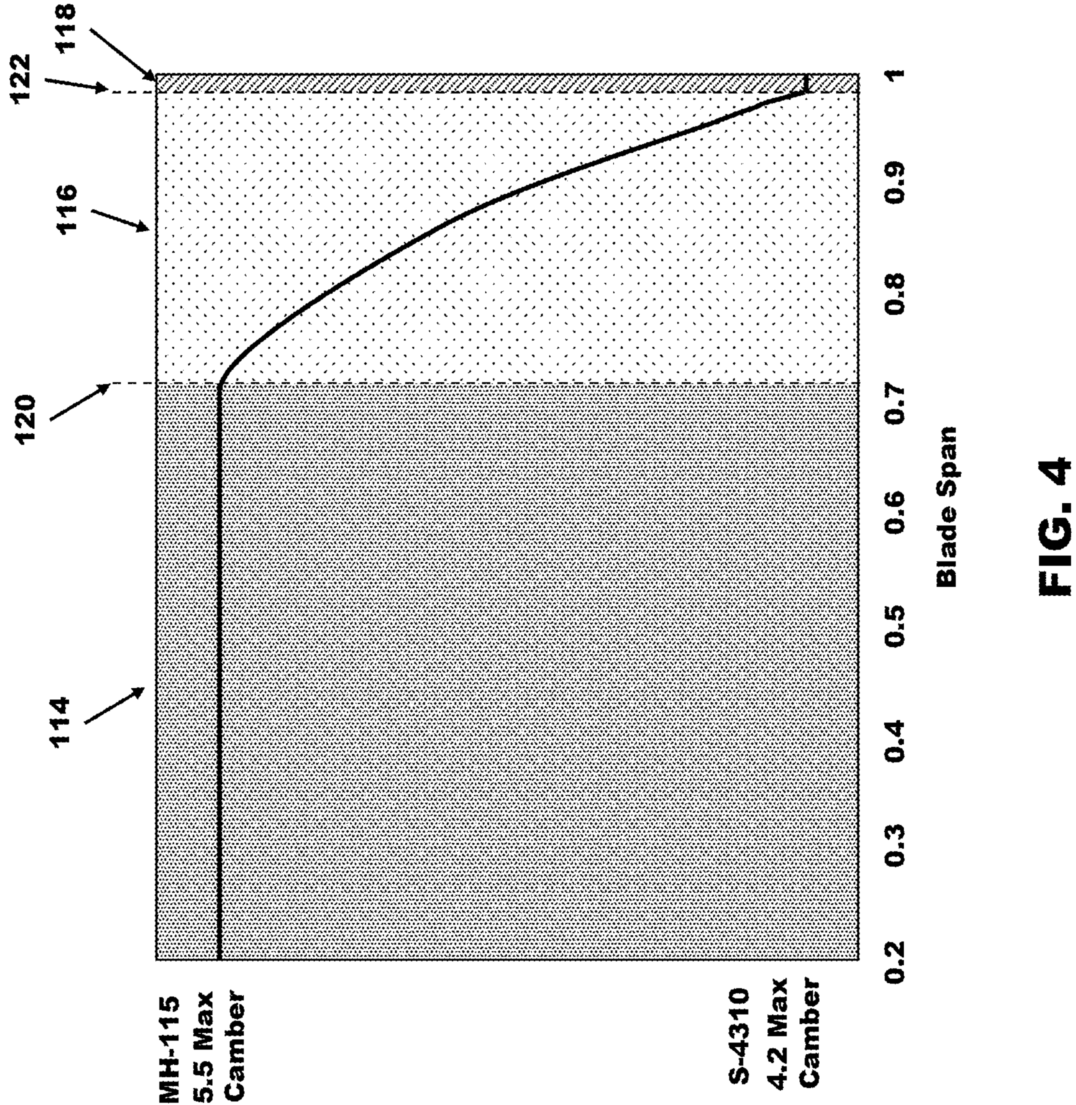
FIG. 4 is a graph of airfoil non-linear transition across a blade span in accordance with various embodiments.

FIG. 4 is a graph of an example airfoil non-linear transition across a blade span in accordance with various embodiments. Specifically, FIG. 4 illustrates the transition of a MH-115 airfoil as the first airfoil 114 to a S-4310 airfoil as the second airfoil 118. FIG. 4 illustrates the difference in the maximum camber percentage from the MH-115 airfoil, reducing across the non-linear transition, to the less cambered S-4310 airfoil. The first airfoil 114 that is the MH-115 airfoil may cover a first percentage of the blade span 110 such as 72% of the blade span 110. Said another way, the non-linear transition start point 120 may be at 72% of the blade span 110. The MH-115 is a more cambered airfoil than the S-4310 airfoil. In the non-linear transition section 116, the airfoils then non-linearly taper from the MH-115 airfoil to the less cambered S-4310 airfoil. The non-linear transition section 116 may run from 72% to 98% of the blade span 110. Said another way, the non-linear transition section 116 may run from the non-linear transition start point 120 at 72% of the blade span 110 to the non-linear transition end point 122 at 98% of the blade span 110. The S-4310 airfoil may be at the blade tip 108 of the blade at 100% of the blade span 110. This airfoil distribution illustrated in FIG. 4, may enable the unloading of the tip necessary for the coefficient of lift distribution that may not entirely be achieved by the twist of the propeller blade alone as proposed by Bowers. The less cambered airfoil (i.e., the S-4310 airfoil that is the second airfoil 118) allows for the blade 104 to not have to twist as much at the tip as it would have if the airfoil was kept at a constant higher cambered airfoil (i.e., the MH-115 airfoil that is the first airfoil 114 without having the non-linear transition section 116 or second airfoil 118) along the blade span 110. This reduction in the tip twist may reduce the noise of the propeller system 100 in comparison to classical MIL propellers and Bowers's Prandtl propeller.

Figure 5:
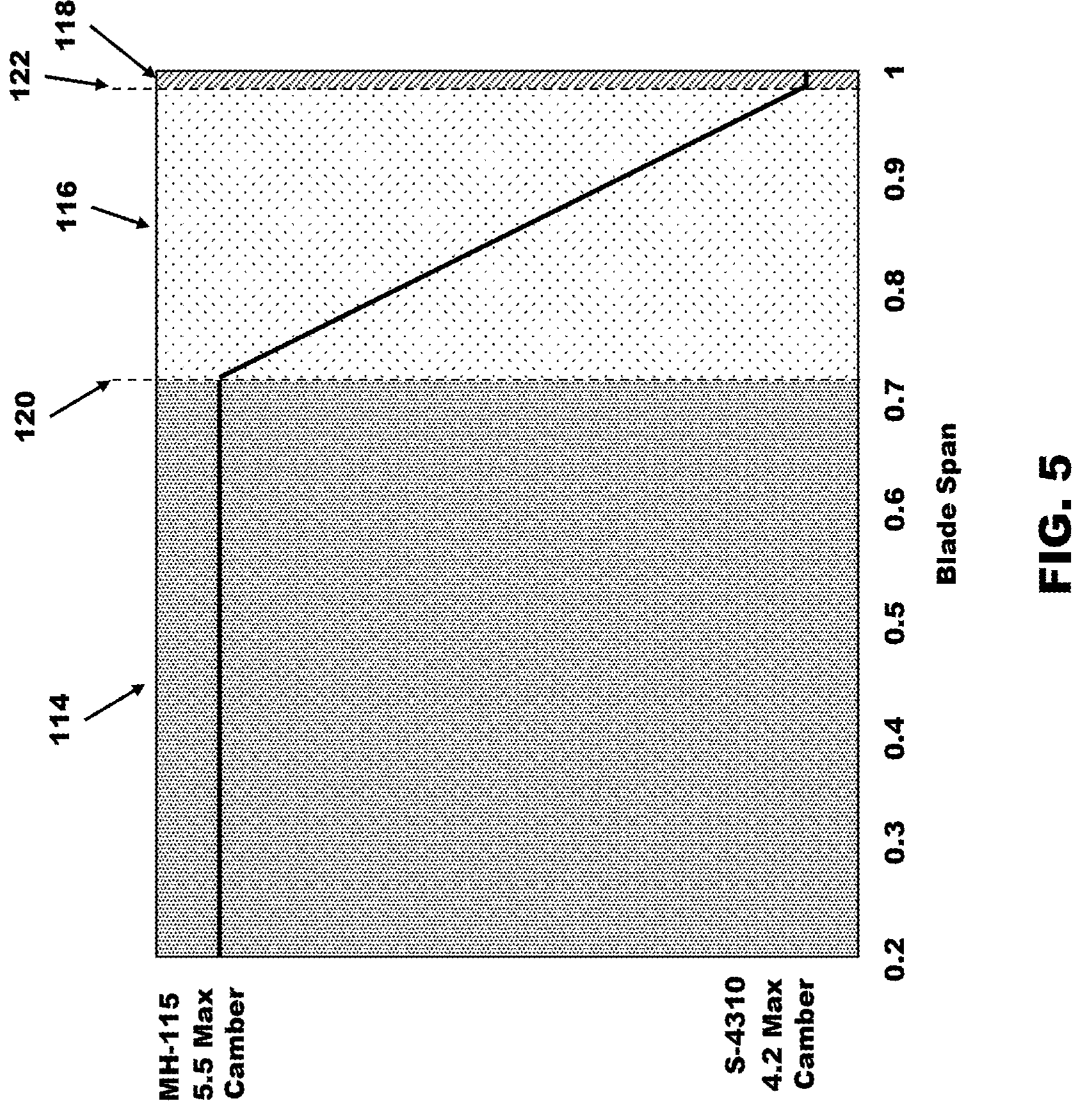
FIG. 5 is a graph of airfoil linear transition across a blade span in accordance with various embodiments.

FIG. 5 is a graph of airfoil linear transition across a blade span in accordance with various embodiments. Specifically, FIG. 5 illustrates the transition of a MH-115 airfoil as the first airfoil 114 to a S-4310 airfoil as the second airfoil 118. FIG. 5 illustrates the difference in the maximum camber percentage from the MH-115 airfoil, reducing across the linear transition, to the less cambered S-4310 airfoil. The first airfoil 114 that is the MH-115 airfoil may cover a first percentage of the blade span 110 such as 72% of the blade span 110. Said another way, the linear transition start point 120 may be at 72% of the blade span 110. The MH-115 is a more cambered airfoil than the S-4310 airfoil. In the linear transition section 116, the airfoils then linearly taper from the MH-115 airfoil to the less cambered S-4310 airfoil. The linear transition section 116 may run from 72% to 98% of the blade span 110. Said another way, the linear transition section 116 may run from the linear transition start point 120 at 72% of the blade span 110 to the linear transition end point 122 at 98% of the blade span 110. The S-4310 airfoil may be at the blade tip 108 of the blade at 100% of the blade span 110. This airfoil distribution illustrated in FIG. 5, may enable the unloading of the tip necessary for the coefficient of lift distribution that may not entirely be achieved by the twist of the propeller blade alone as proposed by Bowers. The less cambered airfoil (i.e., the S-4310 airfoil that is the second airfoil 118) allows for the blade 104 to not have to twist as much at the tip as it would have if the airfoil was kept at a constant higher cambered airfoil (i.e., the MH-115 airfoil that is the first airfoil 114 without having the linear transition section 116 or second airfoil 118) along the blade span 110. This reduction in the tip twist may reduce the noise of the propeller system 100 in comparison to classical MIL propellers and Bowers's Prandtl propeller.

Some embodiments may provide for a coefficient of lift distribution across the blade 104 in which the coefficient of lift transitions from a higher coefficient of lift at the first blade section 111 to a lower coefficient of lift at the second blade section 115. Such coefficient of lift distribution across the blade 104 may be achieved by adjusting angle of attack, airfoil camber, or a combination of angle of attack and airfoil camber to transitions from a higher coefficient of lift at the first blade section 111 to a lower coefficient of lift at the second blade section 115. The achievement of such coefficient of lift distribution across the blade 104 using both adjustment of the angle of attack and the airfoil camber from the first blade section 111 to the second blade section 115 across the transition section 116 may acoustically beneficial, for example by reducing the noise of the propeller system 100 in comparison to classical MIL propellers and Bowers's Prandtl propeller. When the coefficient of lift distribution transitions from a higher coefficient of lift at the first blade section 111 to a lower coefficient of lift at the second blade section 115, the airfoil shape from the first blade section 111 to the second blade section 115 may transition shape linearly, may transition shape non-linearly, or the airfoil shape may not change and thereby remain constant. As a specific example, when the coefficient of lift distribution transitions from a higher coefficient of lift at the first blade section 111 to a lower coefficient of lift at the second blade section 115, the airfoil shape from the first blade section 111 to the second blade section 115 may transition from a high camber airfoil to a low camber airfoil shape linearly, may transition from a high camber airfoil to a low camber airfoil shape non-linearly, or the airfoil camber may not change and thereby remain a constant camber while the coefficient of lift is changing.

This propeller designs and technology of the various embodiments may be extremely useful for the up-and-coming field of UAM where aerial car-sized, people-carrying vehicles will allow faster, more convenient transportation in urban environments. The propeller design of the various embodiments promises to be more efficient and quieter-two main challenges in the field of UAM for public acceptance and use.

Any step of any embodiment described herein can be used in any other embodiment. The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein

What is claimed is:

1. A propeller blade comprising:
- a blade body extending from a blade tip to a blade root defining a blade span, the blade body comprising:
  - a first blade section extending from the blade root to a transition start point, the first blade section comprising a first airfoil;
  - a transition section extending from the transition start point to a transition end point; and
  - a second blade section extending from the transition end point to the blade tip, the second blade section comprising a second airfoil,
- wherein the first airfoil is different than the second airfoil; and
- wherein the transition section defines a non-linear transition span in which a rate of change of airfoil shape from the first airfoil to the second airfoil between the transition start point and the transition end point is not constant.

2. The blade of claim 1, wherein the first airfoil is a more cambered airfoil than the second airfoil.

3. The blade of claim 1, wherein the first blade section defines a first length that is 70% or greater than the blade span and where the second blade section defines a second length that is 3% or less of the blade span.

4. The blade of claim 1, wherein the first blade section defines a first length that is 72% of the blade span and wherein the second blade section defines a second length that is 2% of the blade span.

5. The blade of claim 1, wherein the first airfoil is a MH-115 airfoil and the second airfoil is a S-4310 airfoil.

6. The blade of claim 1, wherein the transition start point is located at a position that is at least 50% of the blade span and wherein the transition end point is located at a position that is less than 99% of the blade span.

7. The blade of claim 1, wherein the rate of change of the airfoil shape from the first airfoil shape to the second airfoil shape increases when moving along the blade span towards the second airfoil.

8. The blade of claim 1, wherein the transition section defines a transition length and the second blade section defines a second length, and wherein the transition length occupies a greater percentage of the blade span than the second length.

* * * * *